(12) United States Patent
Matsuda

(10) Patent No.: US 8,745,711 B2
(45) Date of Patent: Jun. 3, 2014

(54) ACCESS MANAGEMENT SYSTEM, ACCESS MANAGEMENT METHOD, ACCESS MANAGEMENT SERVER, COOPERATION SERVER, AND COMPUTER-READABLE MEDIUM

(75) Inventor: Kotaro Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/551,328

(22) Filed: Jul. 17, 2012

(65) Prior Publication Data
US 2013/0047247 A1    Feb. 21, 2013

(30) Foreign Application Priority Data
Aug. 19, 2011    (JP) ................................. 2011-179912

(51) Int. Cl.
H04L 29/06    (2006.01)

(52) U.S. Cl.
USPC .................................................. 726/6; 726/9

(58) Field of Classification Search
USPC .......................................... 726/9, 10, 5, 6, 2
See application file for complete search history.

(56) References Cited

U.S. PATENT DOCUMENTS

| | | |
|---|---|---|
| 7,269,853 B1 | 9/2007 | Dunn |
| 8,108,927 B2 | 1/2012 | Michelle |
| 8,370,265 B2 | 2/2013 | Coulter |
| 2008/0115226 A1* | 5/2008 | Welingkar et al. ............... 726/28 |
| 2010/0142711 A1* | 6/2010 | Weis et al. .................... 380/277 |
| 2011/0055913 A1 | 3/2011 | Wong |

FOREIGN PATENT DOCUMENTS

| | | |
|---|---|---|
| EP | 1147739 | 10/2001 |
| JP | 2011-18156 | 1/2011 |
| WO | 01/67219 | 9/2001 |

OTHER PUBLICATIONS

European Search Report dated Apr. 18, 2013 issued during prosecution of related European application No. 12179710.4.
European Search Report dated Nov. 26, 2012 issued during prosecution of related European Application No. 12179710.4.

* cited by examiner

*Primary Examiner* — Edward Zee
(74) *Attorney, Agent, or Firm* — Fitzpatrick, Cella, Harper & Scinto

(57) ABSTRACT

A system includes an access management server and a cooperation server, wherein the access management server comprises issuance unit that issues a token corresponding to the managed user account in response to a request of the cooperation server, and deletion unit that deletes a user account, of the managed user accounts, which satisfies a predefined deletion condition, and the cooperation server comprises acquisition unit that acquires, when acquisition of a token corresponding to the user account managed by the access management server is requested by another server, if the deletion unit has not deleted the user account, an issued token corresponding to the user account, and to cause, if the deletion unit has already deleted the user account, the access management server to re-register the user account to acquire a token issued for the re-registered user account.

12 Claims, 16 Drawing Sheets

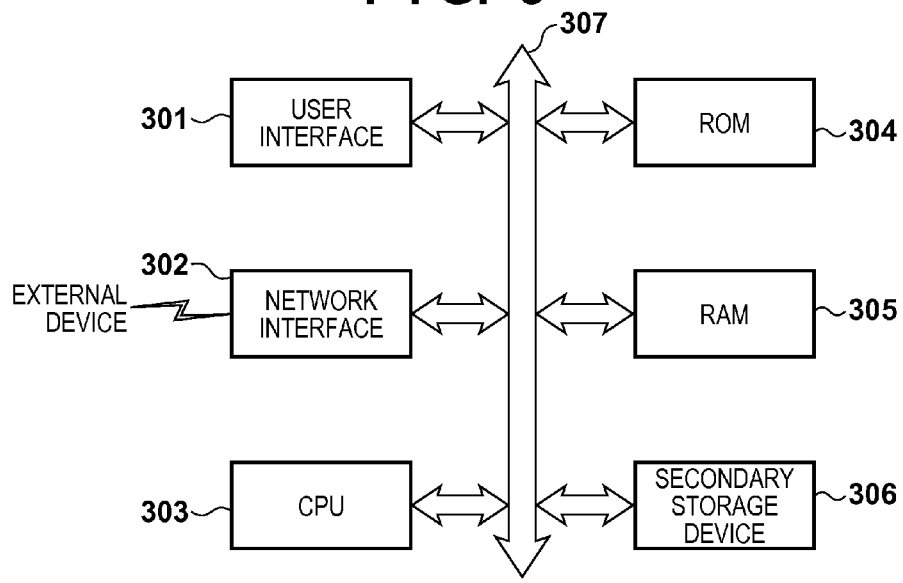
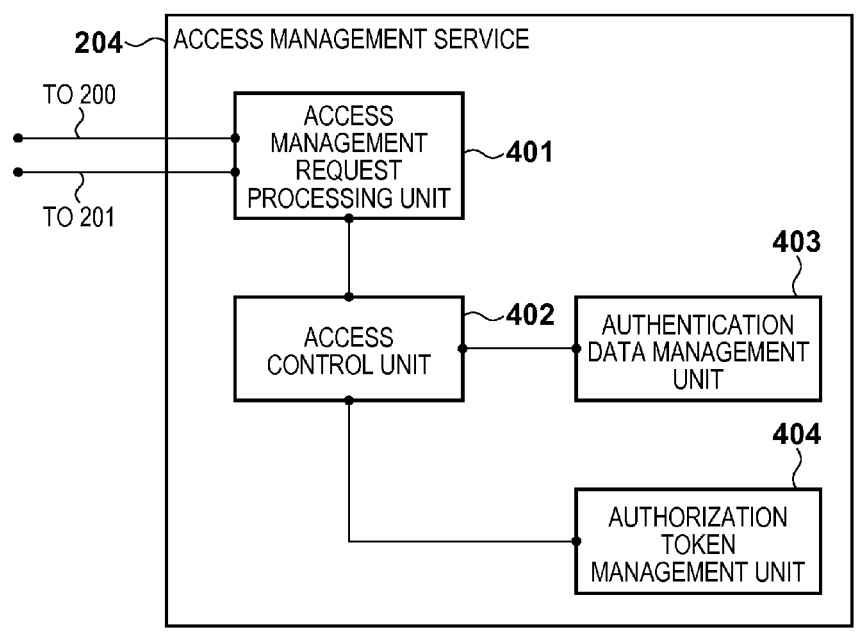

FIG. 6

ID MANAGEMENT TABLE 600

| PRINTER ID 601 | USER ID 602 | PASSWORD 603 | AUTHORIZATION TOKEN 604 |
|---|---|---|---|
| ABC00001 | PRT00000001@1500AA | XXXXXXXXXXXX | CMS_auth01_eoij30::klj3oia8d0a3 |
| DEF00001 | PRT00000002@1500AA | XXXXXXXXXXXX | CMS_auth01_eoij30::klj3oia8e8b1 |

FIG. 7A

USER TABLE (700)

| USER ID (701) | PASSWORD (702) | TENANT ID (703) | LAST LOGIN DATE/TIME (704) |
|---|---|---|---|
| printAdmin@1500AA | **************** | 1500AA | 20110101000000 |
| PRT00000001@1500AA | ************** | 1500AA | 20110601120000 |
| PRT00000002@1500AA | **************** | 1500AA | 20110601120000 |
| 08badf0a-48b3-8fe3@1000000AAxl | **************** | 1000000AA | ... |
| ... | | | |

FIG. 7B

USER ROLE TABLE (710)

| USER ID (711) | ROLE (712) |
|---|---|
| printAdmin@1500AA | Admin |
| 08badf0a-48b3-8fe3@1000000AAxl | Invoker |
| userA@1500AA | User |
| ... | ... |

FIG. 8

TOKEN TABLE 800

| TOKEN ID 801 | EXPIRATION DATE 802 | ISSUANCE DATE/TIME 803 | USER ID 804 | TENANT ID 805 | CLIENT ID 806 |
|---|---|---|---|---|---|
| CMS_auth01_eoij30::klj3oia8d0a3 | 2600000 | 20110501120000 | PRT00000002@1500AA | 1500AA | 08badf0a-48b3-8fe3-8@1000000AAxl |
| CMS_auth01_ki8101::ai380kah38a8 | 2600000 | 20110601120000 | PRT00000001@1500AA | 1500AA | 08badf0a-48b3-8fe3-8@1000000AAxl |
| ... | ... | ... | ... | ... | ... |

F I G. 9

LOG TABLE 900

| TIME STAMP 901 | USER ID 902 | TENANT ID 903 | ACTION ID 904 |
|---|---|---|---|
| 20110501120000 | PRT00000002@1500AA | 1500AA | Print-ConvertPDF |
| 20110601120000 | PRT00000001@1500AA | 1500AA | Print-GetPrintJob |
| ... | ... | ... | ... |

F I G. 12

TENANT TABLE 1200

| TENANT ID | USER ACCOUNT DELETION CONDITION | SET THRESHOLD |
|---|---|---|
| 1500AA | 0 | |
| 1501AA | 1 | 30 |
| 1502AA | 2 | 10000 |
| 1000000AA | 0 | |
| ... | ... | ... |

1201  1202  1203

F I G. 14
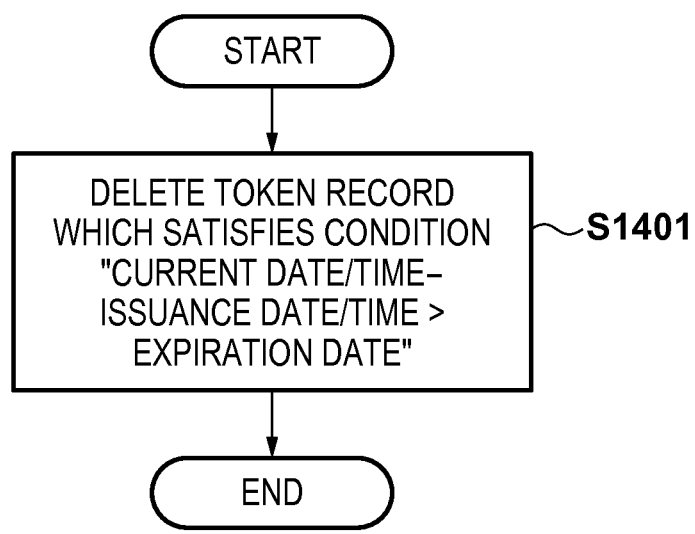

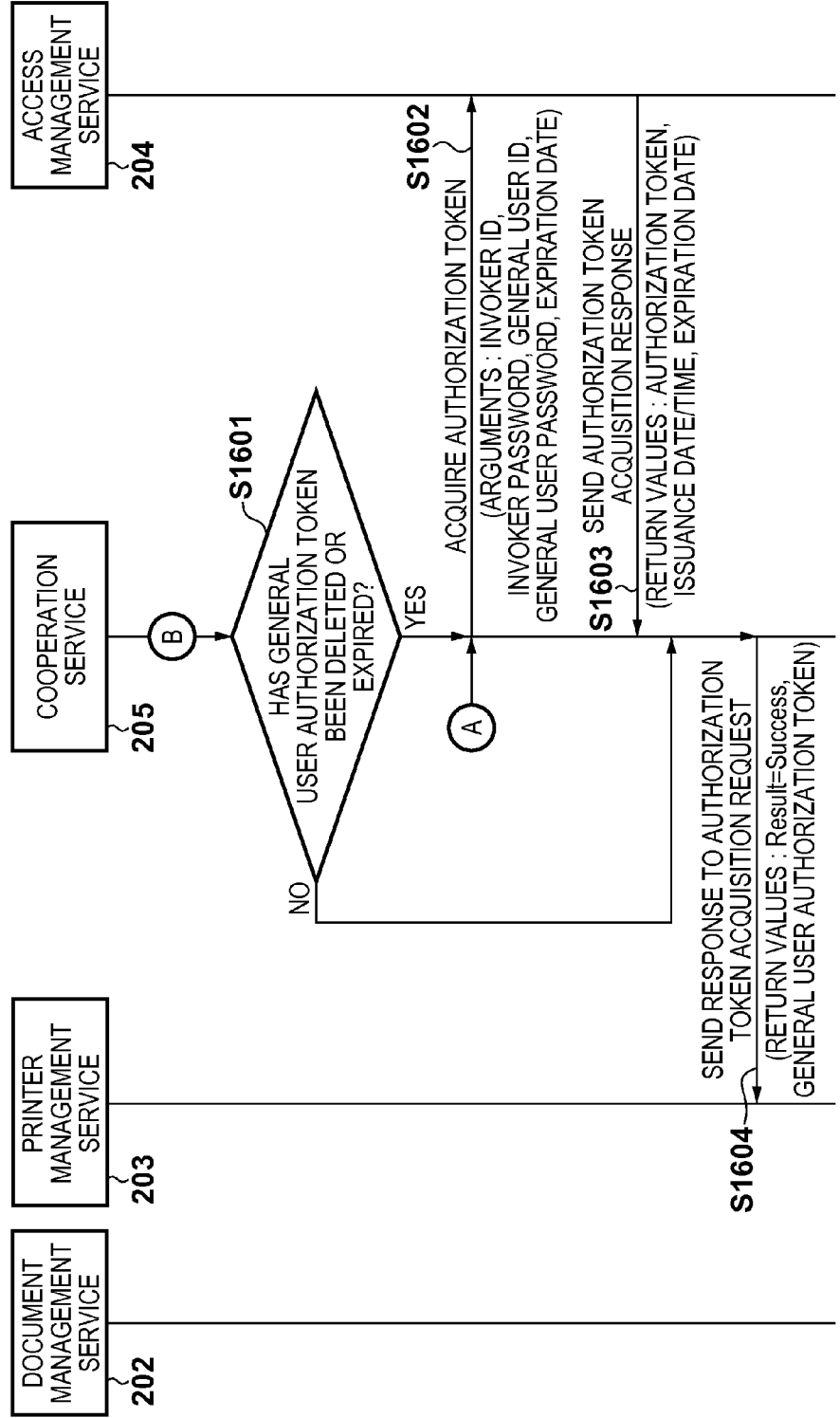

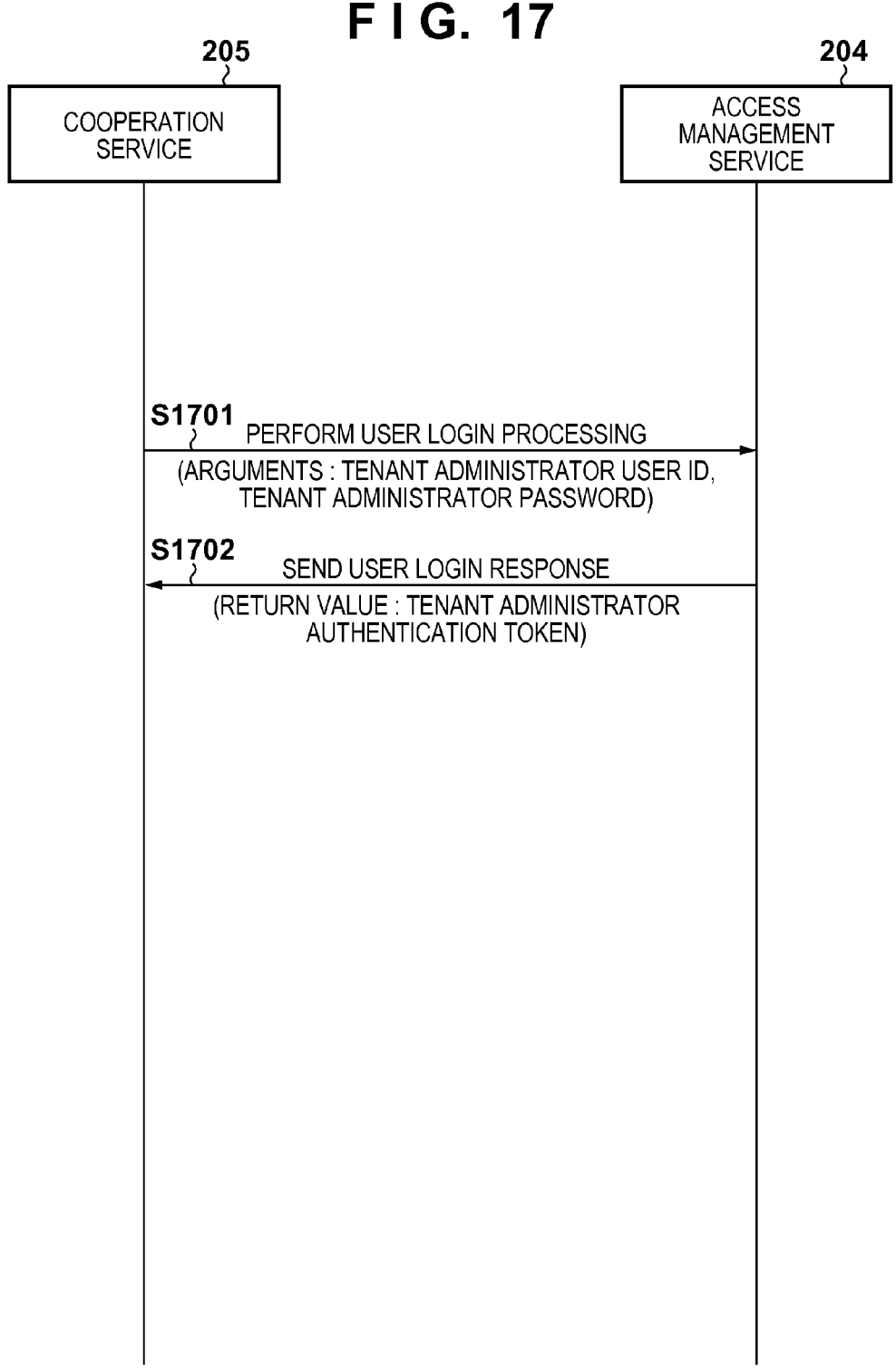

ACCESS MANAGEMENT SYSTEM, ACCESS MANAGEMENT METHOD, ACCESS MANAGEMENT SERVER, COOPERATION SERVER, AND COMPUTER-READABLE MEDIUM

BACKGROUND OF THE INVENTION

1. Field of the Invention

The present invention relates to an access management system, access management method, access management server, cooperation server, and computer-readable medium for efficiently managing user accounts in an online print service system.

2. Description of the Related Art

In recent years, the keyword "cloud computing" or "cloud" has become widespread, mainly in the IT industry. A shift from a model in which conventional computer hardware and software are purchased/utilized to a model in which services on the Internet are purchased/utilized has accelerated.

An example of such a service model is SaaS (Software as a Service) in which a service provider provides software through the Internet and a service user uses the desired software mainly by means of a browser. A service provider need only construct a Web site for providing software on the Internet, and need not distribute the software. A service user need not install dedicated software on his/her computer, and can generally use the desired software using only a browser and its plugin.

To use a service provided in cloud computing, it is common for a user to register his or her account. Each user logs into a service with a user account to use the service. It is cumbersome for an administrator to manually manage registration/invalidation/deletion of user accounts. In particular, deletion of user accounts is an important management operation in order to prevent user accounts not in use from being fraudulently used.

According to Japanese Patent Laid-Open No. 2011-18156, it is proposed to provide a new state, "scheduled deletion", in addition to "normal" and "deletion". A user ID set in the scheduled deletion state is temporarily invalidated, and is then physically deleted after an expiration date. By introducing the scheduled deletion state, it is possible to give a grace period until a user ID is physically deleted, and to validate the user ID again as needed. Furthermore, assume that a user ID may be used again in future. In this case, by setting an appropriate expiration date, and setting the user ID in the scheduled deletion state, it is possible to validate the user ID again without re-generating a user ID. This gives flexibility to a management operation of deleting a user ID, thereby reducing the administrator's labor.

In Japanese Patent Laid-Open No. 2011-18156, however, if the same user ID is reused, the following two problems arise. First, after an expiration date, it is necessary to newly re-generate a user ID. In this case, the administrator or the user has to newly generate a user ID even if they do not wish to. Second, in the "scheduled deletion" state, data such as a user ID and its attribute values are held to validate the user ID again to return to the "normal" state, thereby disabling (precluding) reduction of the data amount.

SUMMARY OF THE INVENTION

According to one aspect of the present invention, there is provided an access management system including an access management server for managing user accounts and tokens corresponding to the user accounts, and a cooperation server for causing processes of a plurality of services to cooperate with each other, wherein the access management server comprises issuance unit configured to issue a token corresponding to the managed user account in response to a request of the cooperation server, and account deletion unit configured to delete a user account, of the managed user accounts, which satisfies a predefined deletion condition, and the cooperation server comprises acquisition unit configured to acquire, when acquisition of a token corresponding to the user account managed by the access management server is requested by another server, if the account deletion unit has not deleted the user account, an issued token corresponding to the user account, and to cause, if the account deletion unit has already deleted the user account, the access management server to re-register the user account to acquire a token issued for the re-registered user account.

According to another aspect of the present invention, there is provided an access management server in an access management system which includes the access management server for managing user accounts and tokens corresponding to the user accounts, and a cooperation server for causing processes of a plurality of services to cooperate with each other, comprising: issuance unit configured to issue a token corresponding to the managed user account in response to a request of the cooperation server; and account deletion unit configured to delete a user account, of the managed user accounts, which satisfies a predefined deletion condition.

According to another aspect of the present invention, there is provided a cooperation server in an access management system which includes an access management server for managing user accounts and tokens corresponding to the user accounts, and the cooperation server for causing processes of a plurality of services to cooperate with each other, comprising: acquisition unit configured to acquire, when issuance of a token corresponding to the user account managed by the access management server is requested by another server, if the access management server has not deleted the user account, an issued token corresponding to the user account, and to cause, if the access management server has already deleted the user account, the access management server to re-register the user account to acquire a token issued for the re-registered user account.

According to another aspect of the present invention, there is provided an access management method in an access management system which includes an access management server for managing user accounts and tokens corresponding to the user accounts, and a cooperation server for causing processes of a plurality of services to cooperate with each other, comprising in the access management server, an issuance step of issuing a token corresponding to the managed user account in response to a request of the cooperation server, and an account deletion step of deleting a user account, of the managed user accounts, which satisfies a predefined deletion condition, and in the cooperation server, an acquisition step of acquiring, when acquisition of a token corresponding to the user account managed by the access management server is requested by another server, if the user account has not been deleted in the account deletion step, an issued token corresponding to the user account, and causing, if the user account has already been deleted in the account deletion step, the access management server to re-register the user account to acquire a token issued for the re-registered user account.

According to another aspect of the present invention, there is provided a computer-readable medium storing a program for causing a computer to function as issuance unit configured to issue a token corresponding to a managed user account in response to a request of a cooperation server for causing processes of a plurality of services to cooperate with each other, and account deletion unit configured to delete a user account, of managed user accounts, which satisfies a predefined deletion condition.

According to another aspect of the present invention, there is provided a computer-readable medium storing a program for causing a computer to function as acquisition unit configured to acquire, when issuance of a token corresponding to a user account managed by an access management server is requested by another server, if the access management server has not deleted the user account, an issued token corresponding to the user account, and to cause, if the access management server has already deleted the user account, the access management server to re-register the user account to acquire a token issued for the re-registered user account.

According to the present invention, if user accounts not in use are automatically deleted at regular intervals, and then the use of an automatically deleted user account is requested, the user account is automatically re-generated. This enables the same user ID to be reused, while reducing the data size for user account management.

Further features of the present invention will become apparent from the following description of exemplary embodiments (with reference to the attached drawings).

BRIEF DESCRIPTION OF THE DRAWINGS

FIG. 3 is a block diagram showing a computer configuration;

FIG. 4 is a block diagram showing an access management service configuration;

FIG. 6 is a table showing an example of an ID management table;

FIGS. 7A and 7B are tables showing examples of a user table and a user role table;

FIG. 8 is a table showing an example of a token table;

FIG. 9 is a table showing an example of a log table;

FIG. 12 is a table showing an example of a tenant table;

FIG. 14 is a flowchart illustrating a token deletion processing;

FIG. 16 is a flowchart illustrating the processing of generating a user account and issuing a token; and FIG. 17 is a flowchart illustrating login processing.

DESCRIPTION OF THE EMBODIMENTS

Description of Problems

Specific problems to be solved by the present invention will be described in more detail with reference to FIG. 1. On the Internet, various service providers provide many kinds of services. For example, one service provider operates a single service, or one workflow is implemented by combining a plurality of services. The latter case is called mashup or the like which looks as if it was one Web site or Web service but actually implements a workflow by cooperating with other services to combine necessary functions in the back-end.

For example, a Web site for sharing photos will be exemplified. It is possible to, for example, combine a service provider which hosts an HTTP server or application server for controlling a Web site with another service provider which provides an online storage for storing a large number of image files such as photos. Note that a service herein indicates a group of functions provided by a Web site, a Web application, a Web service, and the like. The Web site, the Web application, the Web service, and the like are software components running on a server computer.

Figure 1:
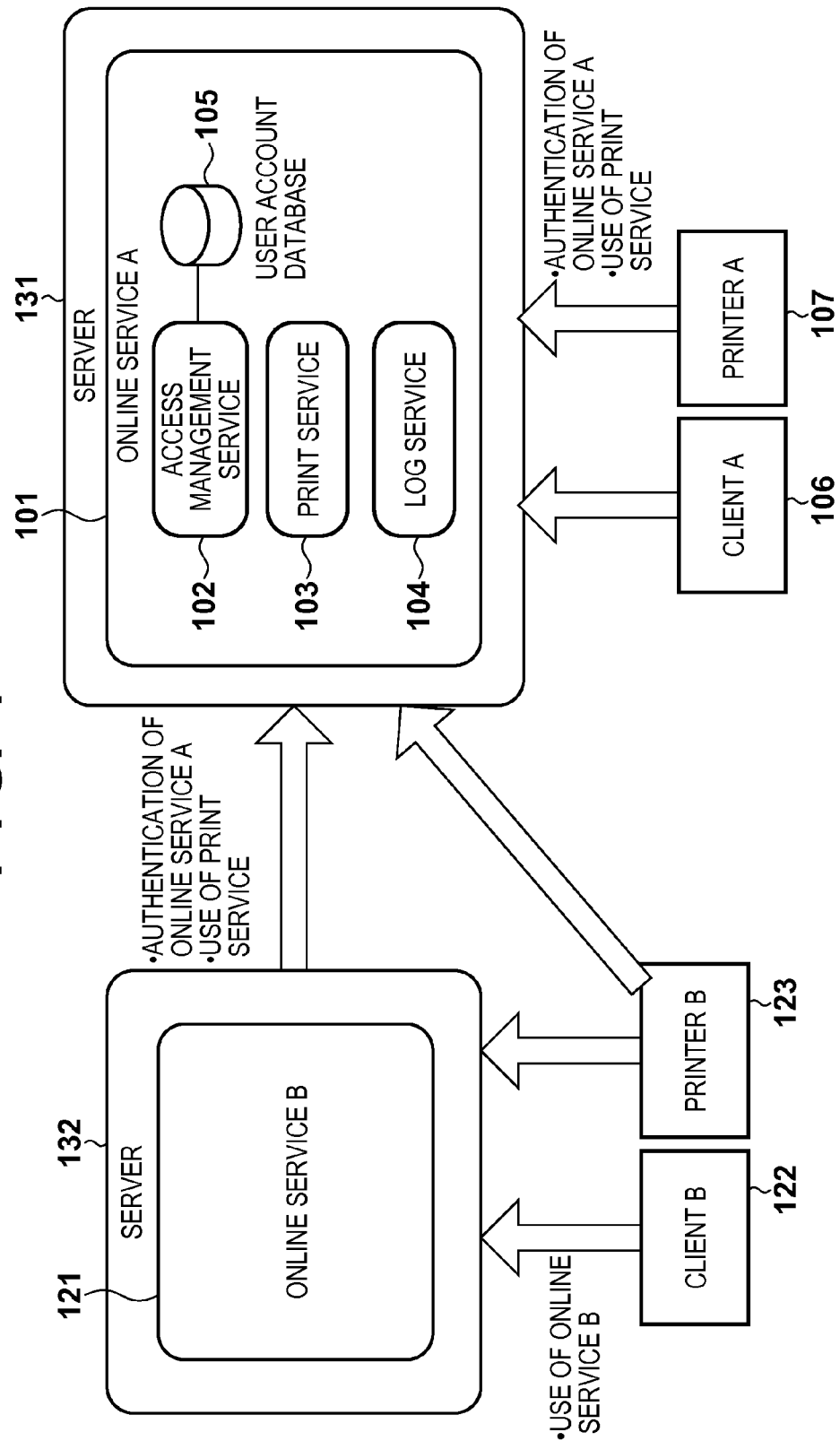
FIG. 1 is a view showing an online service configuration.

As shown in FIG. 1, an online service A 101 exists on the Internet. A server 131 indicates a single server or a group of servers for hosting the online service A 101. The online service A 101 includes an access management service 102, a print service 103, and a log service 104. The access management service 102 includes a user account database 105 for accommodating user accounts.

A client A 106 represents, for example, a browser for making a Web access to the online service A 101. If, for example, the user wants to input/print a document file, he/she logs into the online service A 101 through the client A 106. At this time, a user account and password are input. Based on the input information, the access management service 102 checks, with the user account database 105, that the user exists and the password is valid, thereby authenticating the user.

Then, the client A 106 inputs the document file to the print service 103. The print service 103 converts the input document file into a format which can be output from a printer A 107, and the printer A 107 receives the converted print data. Upon logging into the online service A 101 from the printer A 107, the user outputs printed materials from the printer A 107 based on his/her queued print data. The log service 104 records an operation of inputting/printing out the document file and the like by the user. The above procedure indicates a first use method for online service A.

As a second use method for the online service A 101, an online service B 121 exists outside the online service A 101, and cooperates with the online service A 101 to provide one workflow. A server 132 represents a single server or a group of servers for hosting the online service B 121. If, for example, a client B 122 inputs a document file to the online service B 121, the online service B 121 requests the online service A 101 to convert the document file into print data. The print service 103 converts the document file into print data, and a printer B 123 receives the print data from the print service 103 to output printed material.

Assume, in the first use method, that the user of the client A 106 or printer A 107 is a chargeable license model like a business user. In this case, as the number of users increases, the license revenue also increases. Computing resources can augment with the increased revenue, thereby enabling the accommodation of additional users. If the number of users decreases, it is possible to delete a user account, since the user makes a cancellation. If the user account is deleted, it becomes possible to use freed computing resources, and to accommodate new other users with the freed computing resources.

Assume, in the second use method, that free user accounts like consumer users are accommodated using the computing resources. To use the online service A 101, the user of the online service B 121 needs to be authenticated using a user account issued by the online service A 101. This is done to record a user operation by the log service 104 using a user ID as a key.

A problem in this case is that going by the usage pattern of a consumer user, in most cases the user only uses a service several times initially and then rarely uses it later on; that is, so-called "one-shot use" often occurs. Another problem is that even if cancellation or deregistration processing is prepared for a free service, in many cases the user who no longer uses the service does not execute the cancellation/registration processing due to the fact that the service is free to begin with. Since, therefore, there is no occasion to delete a user account that is no longer used, a large number of free user accounts are unwantedly registered in the user account database 105 as computing resources. Even if free user accounts like consumer users are not necessary, they remain without being deleted, thereby increasing the user account database 105 to suppress the performance, or increasing the data management cost.

Embodiment

[System Configuration]

Figure 2:
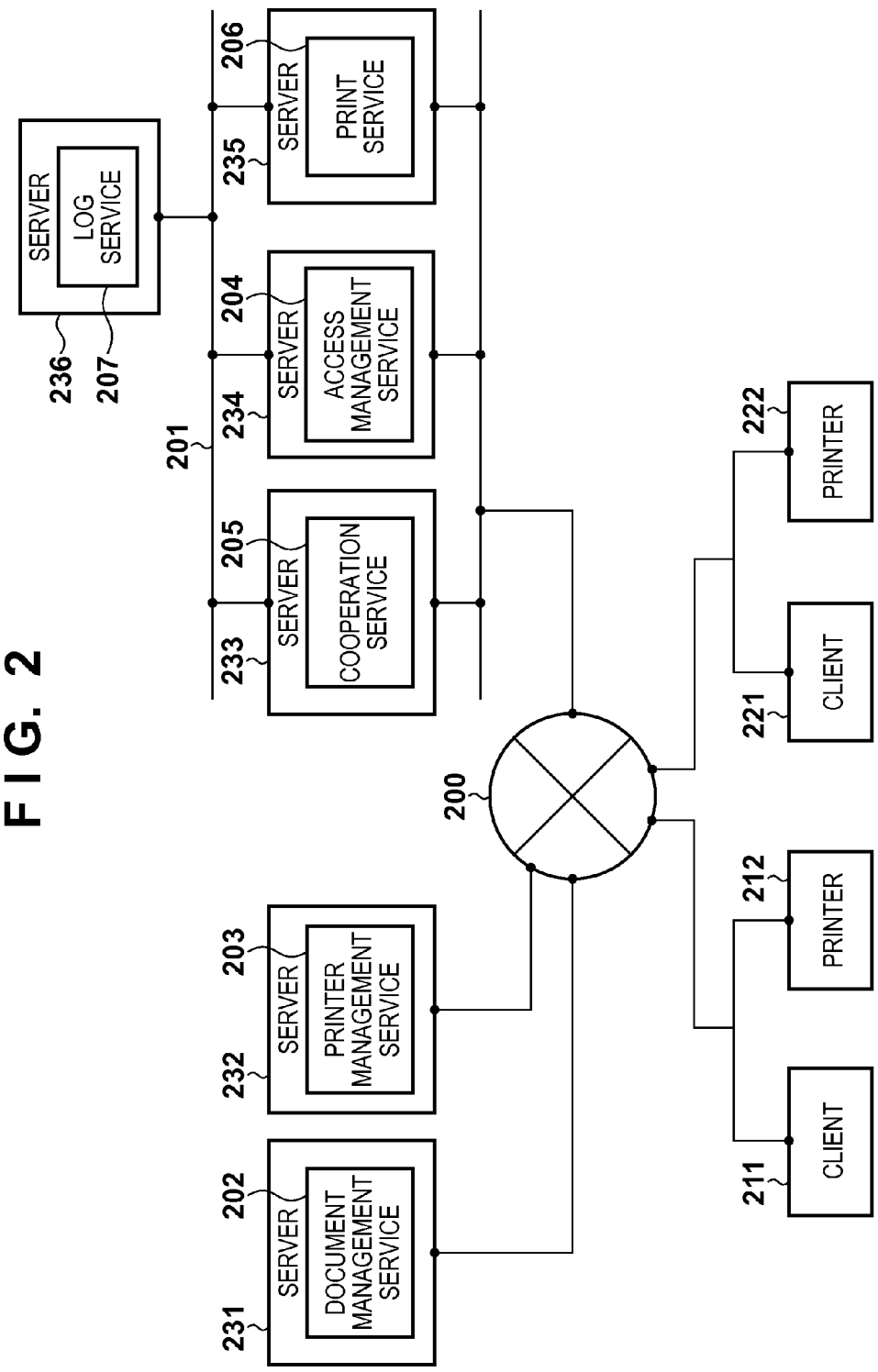
FIG. 2 is a block diagram showing a network configuration.

Best modes for carrying out the present invention will be described below with reference to the accompanying drawings. FIG. 2 shows the configuration of a network forming an access management system according to the present invention in which various online services exist. A network 200 is a public network such as the Internet. A network 201 is a private network such as an intranet. A document management service 202 saves document files of users online. A printer management service 203 manages printers connected to the Internet. An access management service 204 manages authentication/authorization of users. A cooperation service 205 controls cooperation between online services. A print service 206 converts a document file into data printable by a printer. A log service 207 records the history (log) of user operations, in which each record indicates an operation executed in the print service 206, when the operation was executed, and who executed the operation.

A client 211 or 221 is a client such as a client computer or mobile terminal used to use an online service. A printer 212 or 222 receives print data to print it. Note that in this embodiment, the client 221 or printer 222 is a target which directly uses the access management service 204 and print service 206, and does not connect to the document management service 202 or printer management service 203 as an external service.

On the other hand, the client 211 or printer 212 is a target which directly uses the document management service 202 and printer management service 203, and indirectly uses the access management service 204 and print service 206 through the cooperation service 205. Severs 231 to 236 host the respective services.

Assume that the document management service 202 (document management server) and the printer management service 203 (printer management server) belong to the online service B 121 in FIG. 1. Similarly, assume that the cooperation service 205 (cooperation server), the access management service 204 (access management server), the print service 206 (print server), and the log service 207 (log server) belong to the online service A 101 in FIG. 1.

Note that although various services are configured to be provided by different servers in this embodiment, the present invention is not limited to this. For example, one physical server may provide a plurality of services, or a plurality of servers may provide one service.

FIG. 3 shows the logical configuration of the information processing function of a server computer (each of the servers 231 to 236) for executing software such as a Web site, Web application, and Web service forming each of the above-described various services. A user interface 301 inputs/outputs information using, for example, a display, a keyboard, and a mouse. For a computer without these hardware components, it is possible to make a connection and perform an operation through another computer using a remote desktop or the like. A network interface 302 connects to a network such as a LAN to communicate with another computer or network device.

A ROM 304 records embedded programs and data. A RAM 305 serves as a temporary memory area. A secondary storage device 306 is represented by an HDD. A CPU 303 executes programs loaded from the ROM 304, RAM 305, or secondary storage device 306, thereby implementing various services. The respective units are interconnected via an input/output interface 307. Note that in addition to the above configuration, further units may be provided. The client 211 or 221, or the printer 212 or 222 may have the similar configuration. In this embodiment, with the above-described configuration, each server executes processing indicated by each sequence below.

FIG. 4 shows the internal configuration of the access management service 204. An access management request processing unit 401 receives requests from the client 221, the printer 222 and another service via the Internet 200 or intranet 201. An authentication data management unit 403 manages data of user accounts. An authorization token management unit 404 manages data of authorization tokens. An access control unit 402 generates response data to an authentication/authorization request based on data acquired from the authentication data management unit 403 and authorization token management unit 404, and returns the response data to the access management request processing unit 401. The access management request processing unit 401 returns the response data to the other service.

Figure 5:
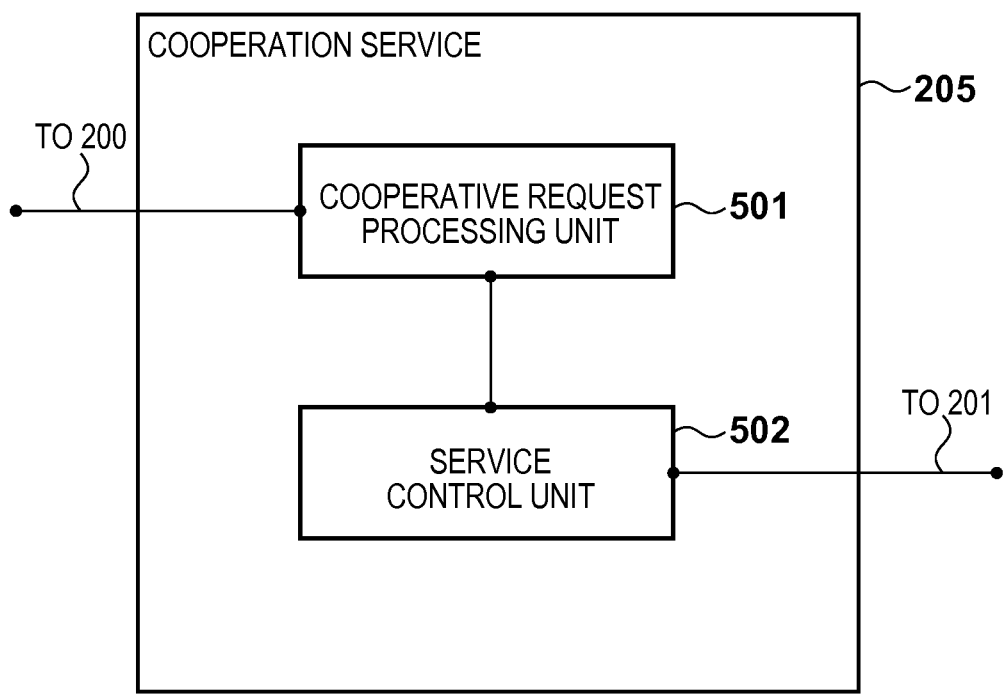
FIG. 5 is a block diagram showing a cooperation service configuration.

FIG. 5 shows the internal configuration of the cooperation service 205. A cooperative request processing unit 501 receives a request for document file data conversion from another service via the Internet 200. Upon receiving the request from the cooperative request processing unit 501, a service control unit 502 executes necessary processing for the access management service 204 and print service 206 via the intranet 201, and returns response data. The cooperative request processing unit 501 returns the response data to the other service.

Terms used herein will be described. In this specification, a term "authentication token" indicates a token generated when login processing using a user ID and password succeeds. By commonly using the authentication token in the same login session, the login user can use all accessible functions. The life cycle of the authentication token corresponds to the login session, and is invalidated when, for example, a logout operation is performed or a session time-out occurs.

A term "authorization token" indicates a token generated in response to an authorization token acquisition request with a valid user ID/password. That is, the authorization token is used to permit execution of a specific function or an access to a specific URL, and an access using the authorization token is limited to a permitted authorization. For example, the authorization token permits an access to data (a URL) or a function of the print service 206. The authorization token is used to cause an external program to execute processing instead of the user. That is, an authorization token is given to a program or the like to grant an authorization held by the user, thereby enabling to cause the program or the like to execute processing instead of the user (for example, as an invoker). The life cycle of an authorization token is until a set expiration date, and can be used any number of times before the expiration date. Note that a specific value for the expiration date will be described with reference to FIG. 8.

[Data Structure]

A data structure used in this embodiment will be described below. Note that the identical column names (for example, a user ID) in respective tables indicate a common item among the tables. The data structure explained below is merely an example, and other components may be included. Furthermore, the type of data value (for example, the number of digits and alphanumeric characters) is not limited to the following one, and a different type of data value may be possible.

FIG. 6 shows an ID management table 600 obtained by representing a data structure for ID management in a table format, and held by the printer management service 203. A printer ID 601 is a column used to store the printer ID of the printer 212. A user ID 602 is a column used to store a user ID. A password 603 is used to store a password. An authorization token 604 is a column used to store an authorization token. The user ID 602, password 603, and authorization token 604 are columns respectively used to hold data issued by the access management service 204.

FIGS. 7A and 7B respectively show data managed by the authentication data management unit 403 in a table format. FIG. 7A shows a user table 700. The user table 700 includes, as components, a user ID 701, a password 702, a tenant ID 703, and a last login date/time 704. The tenant ID indicates an identifier for implementing a multi-tenant environment. Assume, for example, that one system operates a given online service. If the online service is provided to a plurality of customer companies, multi-tenant functions, such as a function of prohibiting access to other customers' data and that of calculating a service fee for each customer, are necessary. The tenant ID 703 is always assigned to each user ID 701 as an identifier for implementing the multi-tenant functions, thereby separating users and data for each tenant. As cloud computing becomes more widespread, data of tenants belonging to different domains are managed in one memory. Therefore, the idea of a multi-tenant environment is very important in cloud computing.

FIG. 7B shows a user role table 710. The user role table 710 includes, as components, a user ID 711 and a role 712. The role defines the role of a user in a tenant to which the user belongs. The set value of the role 712 includes, for example, an administrator (Admin), an invoker (Invoker), and a general user (User). A user who has an administrator role can access all functions/data. The invoker is a role for an unattended service account used to invoke a request from another service. The invoker can access limited functions/data only in some requested processes. The general user is a role corresponding to a so-called end user. The general user role is used by the end user to use a print service.

FIG. 8 shows a token table 800 obtained by representing, in a table format, data managed by the authorization token management unit 404. The token table 800 includes, as components, a token ID 801, an expiration date 802, an issuance date/time 803, a user ID 804, a tenant ID 805, and a client ID 806. The expiration date 802 indicates the expiration date of a corresponding authorization token by the number of seconds. The issuance date/time 803 indicates when the authorization token was issued. The user ID 804 indicates a user for which the authorization token has been issued. The tenant ID 805 indicates a tenant to which the user ID 804 belongs. The client ID 806 is used to record the user ID of an invoker as the issuance request source of the authorization token.

Assume in this embodiment that an authentication token and an authorization token are registered in the token table 800. The tokens may be managed in different tables. In this case, for example, an expiration date is not set for the authentication token. The authorization token may be associated with information indicating which function is available or which data is accessible. For example, the information is a URL when print data provided by the print service 206 is referred to. In this case, assume that the token table 800 manages further information.

FIG. 9 shows a log table 900 obtained by representing, in a table format, data managed by the log service 207. The log table 900 includes, as components, a time stamp 901, a user ID 902, a tenant ID 903, and an action ID 904. The time stamp 901 is a column used to record a date/time when a corresponding operation was performed. The user ID 902 indicates the user ID of a user who performed the operation. The tenant ID 903 indicates the tenant ID of a tenant to which the user who performed the operation belongs. The action ID 904 indicates a type of operation.

[First Use Method]

Figure 10:
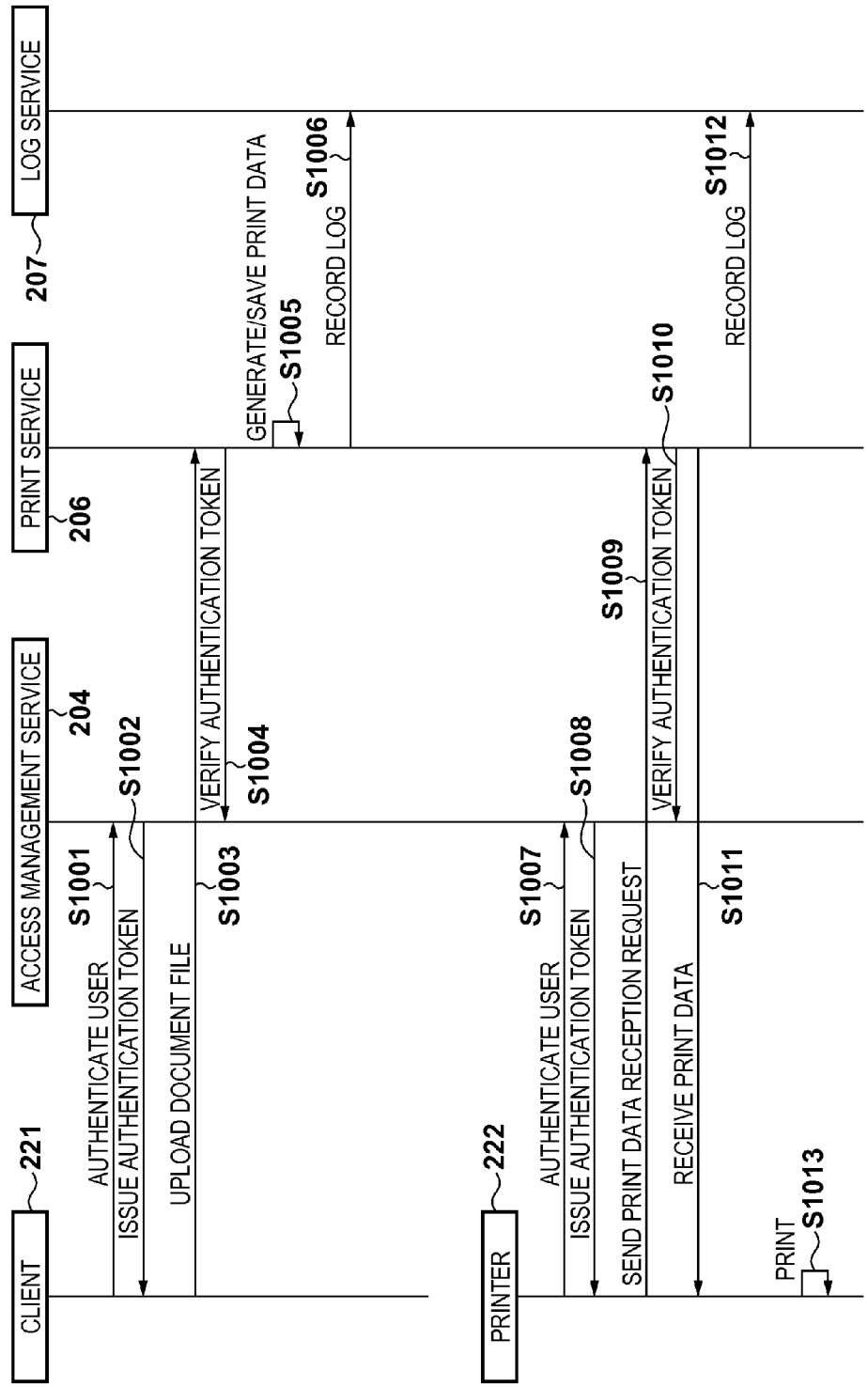
FIG. 10 is a sequence chart showing a first use method.

The first use method of the print service 206 will be explained with reference to FIG. 10. This corresponds to a method in which the client A 106 directly accesses and uses the online service A 101 described with reference to FIG. 1. In the first use method, the client 221 and printer 222 directly use only the access management service 204 and print service 206.

The user of the print service 206 uses a user account registered in the access management service 204 to log into the access management service 204 through the client 221 (step S1001). The access management service 204 checks the user table 700, and determines whether the login operation has succeeded or failed. If the login operation has succeeded, the access management service 204 issues an authentication token (step S1002). The access management service 204 records information about the issued authentication token in the token table 800, as shown in FIG. 8. Note that if the authentication has failed, the access management service 204 notifies the user of it.

The client 221 uploads a document file to the print service 206 (step S1003). At this time, the authentication token is also passed. The print service 206 inquires of the access management service 204 about the received authentication token to verify its validity (step S1004). The access management service 204 checks the token table 800, and determines whether the authentication token is valid. Upon receiving information indicating that the authentication token is valid, the print service 206 generates data printable by a printer based on the uploaded document file, and temporarily saves it (step S1005). Note that upon receiving information indicating that the authentication token is invalid, the print service 206 terminates abnormally. After the print data is generated/saved, the print service 206 records, in the log service, an operation log indicating that the print data has been generated (step S1006).

The user uses the printer 222 to log into the access management service 204 (step S1007). The access management service 204 checks the user table 700, and determines whether the login operation has succeeded or failed. If the login operation has succeeded, the access management service 204 issues an authentication token (step S1008). The printer 222 requests the print service 206 to receive the saved print data of the login user (step S1009). At this time, the authentication token is also passed. The print service 206 inquires of the access management service 204 about the authentication token to verify its validity (step S1010). If the authentication token is valid, the print service 206 permits to receive the print data, and the printer 222 receives the print data from the print service 206 (step S1011). Upon completion of transmission of the print data, the print service 206 records it in the log service (step S1012). The printer 222 outputs the print data on a paper sheet (step S1013). The above procedure is an example of the procedure of the first use method of the print service 206.

[Second Use Method]

Figure 11:
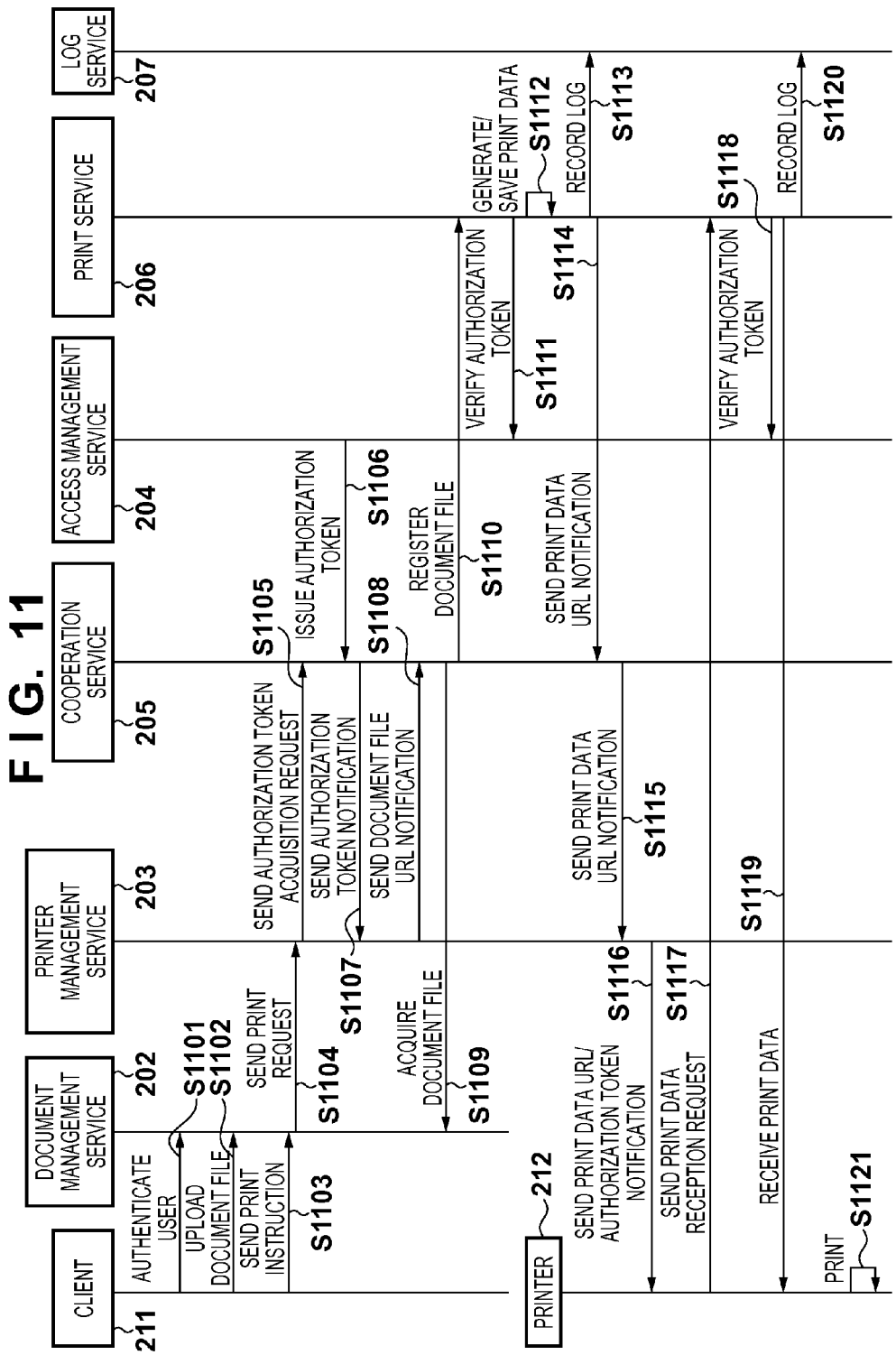
FIG. 11 is a sequence chart showing a second use method.

The second use method of the print service 206 will be described with reference to FIG. 11. This corresponds to a method of using the online service A 101 through the online service B 121 described with reference to FIG. 1. In the second use method, the client 211 and printer 212 use the document management service 202 and printer management service 203. Since, however, the document management service 202 and printer management service 203 have no function of generating print data, the print service 206 is used. While the user uses user authentication of the document management service 202, it is necessary to register a user account also in the access management service 204 to use the print service 206. That is, user authentication in the document management service 202 is different from that in the print service 206.

The user uses the client 211 to log into the document management service 202 (step S1101). The user uses the client 211 to upload a document file to the document management service 202 (step S1102). The user sends a document file print instruction from the client 211 to the document management service 202 (step S1103). The document management service 202 transmits a print request to the printer management service 203 (step S1104). At this time, an authorization token needed to acquire the document file, and information (a document file URL) about a position at which the document data to be printed is stored are transmitted together with the print request. Note that the authorization token which is transmitted at this time is an authorization token issued on the document management service 202 side, and is different from that issued by the access management service 204. The use of the authorization token issued on the document management service 202 side allows the cooperation service to use a service (acquire document data or the like) on the document management service side.

The printer management service 203 transmits an authorization token acquisition request to the cooperation service 205 (step S1105). The access management service 204 issues an authorization token for the cooperation service 205 (step S1106). The authorization token here represents the token ID 801 indicating permission to access/use the print service 206.

To use the print service 206 through the cooperation service 205 and printer 212, the user uses the authorization token to get permission for the use of the print service 206. The cooperation service 205 notifies the printer management service 203 of the authorization token (step S1107). The printer management service 203 notifies the cooperation service 205 of the URL of the document file to be printed, which has been received in step S1104 (step S1108). At this time, the authorization token received from the document management service 202 is also passed. The cooperation service 205 acquires the document file based on the received document file URL (step S1109). At this time, the document management service 202 checks the authorization token transmitted in step S1104. If the authorization token is valid, the document management service 202 provides the document file to the cooperation service 205.

The cooperation service 205 registers the acquired document file in the print service 206 (step S1110). At this time, the authorization token is also passed. The print service 206 inquires of the access management service 204 about the authorization token to verify its validity (step S1111). If the authorization token is valid, the print service 206 generates, based on the document file, print data printable by the printer, and temporarily saves it (step S1112). The print service 206 records, in the log service, an operation log indicating that the print data has been generated (step S1113).

The print service 206 notifies the cooperation service 205 of information (a print data URL) about a position at which the print data generated in step S1112 is saved (step S1114). The cooperation service 205 notifies the printer management service 203 of the print data URL (step S1115). The printer management service 203 notifies the printer 212 of the print data URL and the authorization token received in step S1107 (step S1116). The printer 212 transmits a print data reception request to the print service 206 (step S1117). At this time, the authorization token is also passed. The print service 206 inquires of the access management service 204 about the authorization token to verify its validity (step S1118). If the authorization token is valid, the print service 206 permits to receive the print data. The printer 212 receives the print data from the print service 206 based on the print data URL (step S1119). Upon completion of transmission of the print data, the print service 206 records it in the log service (step S1120). The printer 212 outputs the print data on a paper sheet (step S1121).

[Method of Accommodating Accounts for Second Use Method]

A method of efficiently accommodating a large number of user accounts used by the document management service 202 and printer management service 203 in the second use method according to this embodiment will be described with reference to FIGS. 12 to 17. Note that in this specification, "automatic" indicates that processing is spontaneously performed on the system side without requesting a user operation.

FIG. 12 shows a tenant table 1200 obtained by representing, in a table format, data of tenant information managed by the authentication data management unit 403. The tenant table 1200 includes, as components, a tenant ID 1201, a user account deletion condition 1202, and a set threshold 1203. The user account deletion condition 1202 is a value indicating a user account deletion condition for each tenant. By definition, for example, a value 0 indicates that a user account is not automatically deleted, a value 1 indicates that a user account is automatically deleted based on a last login date/time, and a value 2 indicates that a user account is automatically deleted based on the total number of user accounts. Note that in addition to the above deletion conditions, other conditions may be set. The set threshold 1203 is a set threshold for an automatic deletion condition. The authentication data management unit 403 assigns one tenant ID to the printer management service 203 and cooperation service 205, and issues a user account having an administrator role and that having an invoker role.

Figure 13:
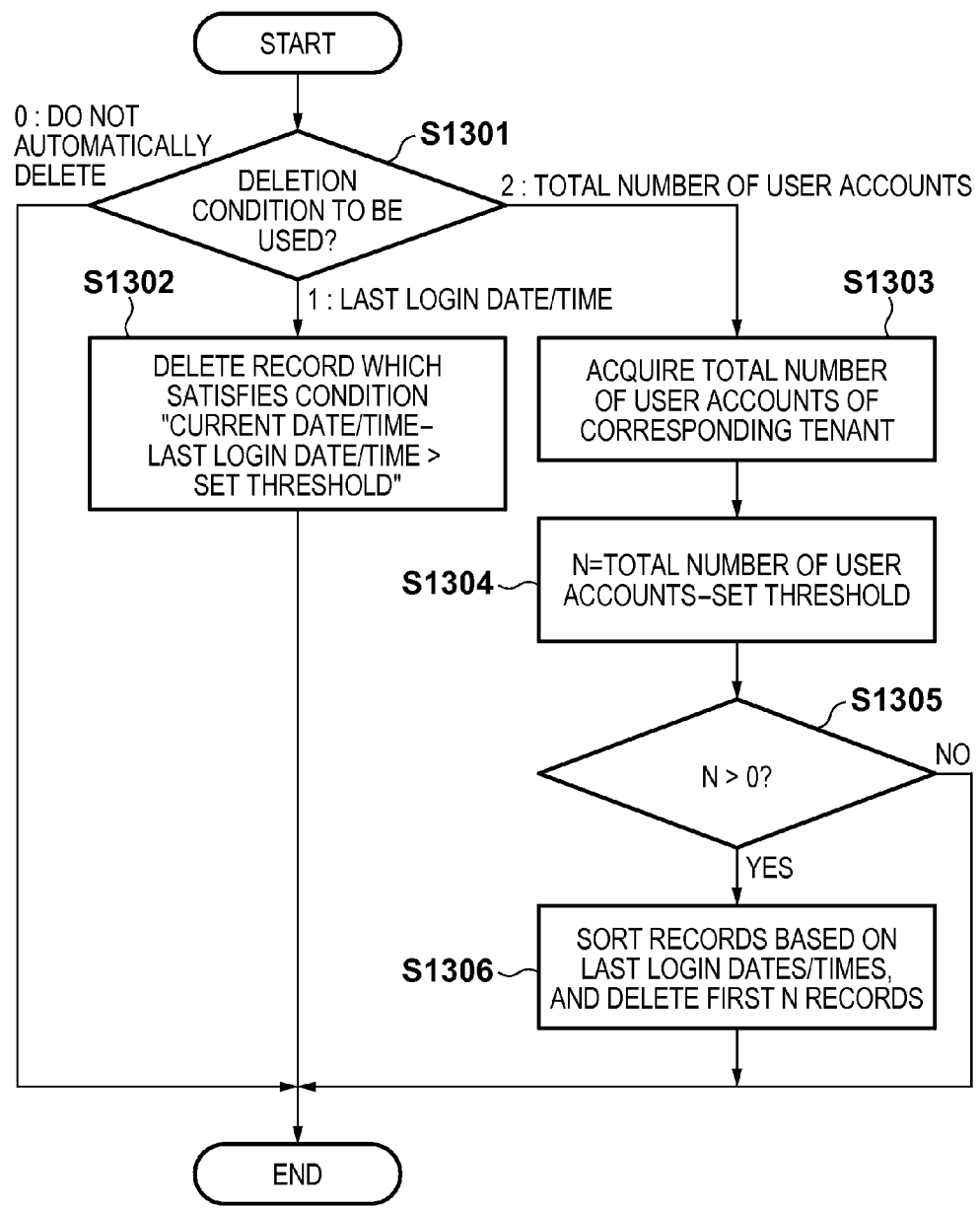
FIG. 13 is a flowchart illustrating user account deletion processing.

FIG. 13 is a flowchart illustrating a procedure of automatically deleting, for each tenant, user accounts not in use. This processing is implemented when the CPU of the server which provides the access management service 204 reads, into the RAM or the like, a program stored in the ROM or the like serving as a storage unit, and executes it.

Based on the user account deletion condition 1202 of the tenant table 1200, the access management service 204 determines a deletion condition to be used (step S1301). If the deletion condition is "0", the access management service 204 does not automatically delete user accounts associated with the tenant ID. If the deletion condition is "1", the access management service 204 deletes, from the user table 700 shown in FIG. 7A, a record, of user account records with the corresponding tenant ID, for which the difference between the current date/time and the last login date/time 704 is larger than the set threshold 1203 (step S1302). That is, a user account for which a predetermined time has elapsed after the last login date time is to be deleted. Assume that a deletion target is a user account having only a general user role (User).

If the deletion condition "2", the access management service 204 acquires, from the user table 700, the total number of user accounts belonging to the corresponding tenant (step S1303). Assume that a target user account is a user account having only a general user role. The access management service 204 calculates the difference between the total number of user accounts and the corresponding set threshold, which is represented by N (step S1304). The access management service 204 determines whether N is larger than "0" (step S1305). If N is larger than "0" (YES in step S1305), the access management service 204 sorts the target user accounts based on their last login dates/times in an ascending order, and deletes the first N user accounts from the user table 700 (step S1306). That is, if the predefined number of accounts is exceeded, the user accounts the number of which is equal to the difference between the total number of accounts and the predefined number of accounts are to be deleted in the ascending order.

By executing the processing at regular intervals, for example, once per day, it is possible to automatically delete, from a tenant set with the deletion condition "1" or "2", user accounts not in use from the oldest one. As a result, the management target data size of the authentication data management unit 403 can be reduced. Note that the present invention is not limited to the above-described case in which the processing is executed once per day, and the processing may be executed at predefined intervals. Furthermore, the processing may start in response to an instruction from the administrator.

FIG. 14 is a flowchart illustrating a procedure of deleting old tokens for each tenant. This token deletion processing is implemented when the CPU of the server which provides the access management service 204 reads, into the RAM or the like, a program stored in the ROM or the like serving as a storage unit, and executes it.

If the difference (the number of seconds) between the current date/time and the issuance date/time 803 is larger than the expiration date 802, the corresponding token has expired, and thus the access management service 204 deletes the record from the token table 800 (step S1401).

By executing the processing at regular intervals, for example, once per day, it is possible to automatically delete expired tokens not to be used. As a result, the management target data size of the authorization token management unit 404 can be reduced. Note that the present invention is not limited to the above-described case in which the processing is executed once per day, and the processing may be executed at predefined intervals. Furthermore, the processing may start in response to an instruction from the administrator.

Using the methods shown in FIGS. 13 and 14, it is possible to select, for each tenant, whether to apply processing of automatically deleting user accounts not in use. Note that in this embodiment, the processing of automatically deleting user accounts is not applied to a tenant having a chargeable license used in the above-described first use method. This is because, in the first use method, a license fee can be collected to cover the cost for holding user account data unless the user makes a cancellation. For a chargeable license user, assume that a user account not in use is automatically deleted. If the user wants to reuse the same user account, he/she experiences an inconvenience although he/she is a chargeable license user.

On the other hand, in the above-described second use method, processing of automatically deleting user accounts is applied to a tenant for accommodating free user accounts. The total amount of data is suppressed when accommodating a large number of user accounts such as consumer users, thereby reducing the user account data management cost. Furthermore, it is possible to prevent the user account database 105 from increasing, and to decrease the influence on the users of the tenant used in the first use method.

[Method of Re-Generating Account for Second Use Method]

Figure 15:
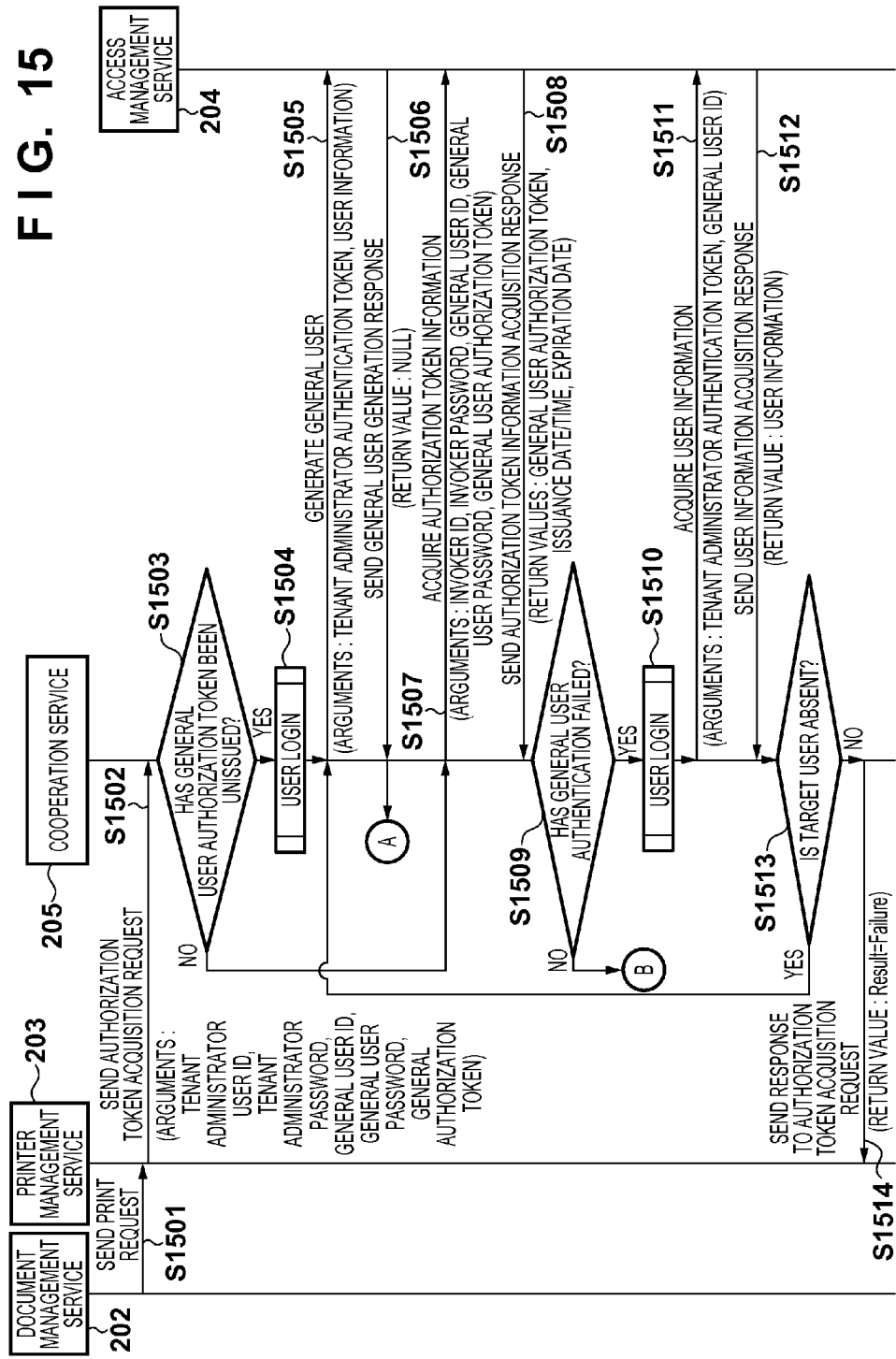
FIG. 15 is a flowchart illustrating processing of generating a user account and issuing a token.

FIGS. 15 and 16 are flowcharts illustrating a procedure of automatically generating (re-generating) and issuing an authorization token if there is no user account in sending an authorization token acquisition request.

The document management service 202 transmits a print request to the printer management service 203 (step S1501). In response to the received print request, the printer management service 203 transmits an authorization token acquisition request to the cooperation service 205 (step S1502). A tenant administrator user ID, a tenant administrator password, a tenant administrator authorization token, a general user ID, a general user password, and a general user authorization token are passed as arguments.

The printer management service 203 holds, in the ID management table 600 shown in FIG. 6, the printer ID 601, and the user ID 602, password 603, and authorization token 604 of the access management service 204 for each printer. That is, the printer management service 203 holds, for each printer, a pair of the printer ID 601 as a printer-specific value and the user ID 602 of the access management service 204. This allows the printer management service 203 to specify the printer ID 601 paired with the user ID 602 upon receiving the notification of the print data URL from the cooperation service 205 in step S1115 shown in FIG. 11. Thus, the printer management service 203 can transfer the print data URL to the appropriate printer 212.

If the user accesses the system for the first time, the printer management service 203 generates a unique user ID 602 and a random password 603, and invokes an authorization token acquisition request with a null authorization token (step S1502). The cooperation service 205 determines the authorization token passed by the printer management service 203 (step S1503). If the authorization token is null, that is, the authorization token has been unissued (YES in step S1503), the process advances to step S1504. If the authorization token has been issued (NO in step S1503), the process advances to step S1507. If the authorization token has been unissued, the cooperation service 205 logs into the access management service 204 using an administrator user ID (step S1504). The processing in step S1504 is a subroutine, which is shown in FIG. 17.

The cooperation service 205 invokes user login processing for the access management service 204 (step S1701). The tenant administrator user ID and the tenant administrator password are passed as arguments. If the login processing has succeeded, the authentication token of a tenant administrator is returned as a response (step S1702). Note that if the login processing has failed, the process terminates abnormally.

After the user login processing, the cooperation service 205 transmits a request to generate a general user to the access management service 204 (step S1505). At this time, the authentication token of the tenant administrator and user information are passed as arguments. The user information contains the user ID 602 and password 603. If the access management service 204 has successfully generated a general user, it returns, to the cooperation service 205, a response indicating that the general user has been successfully generated (step S1506). Then, the process advances to a symbol A in FIG. 16.

On the other hand, if the authorization token has been issued (NO in step S1503), the cooperation service 205 transmits an authorization token information acquisition request to the access management service 204 (step S1507). At this time, an invoker ID, an invoker password, a general user ID, a general user password, and the authorization token of a general user are passed as arguments. The access management service 204 checks the user table 700 and user role table 710, and verifies whether the invoker ID and invoker password received from the cooperation service 205 are valid. This is done to verify whether the cooperation service 205 which has invoked the access management service 204 is using the valid invoker ID and invoker password.

If the verification has succeeded, the access management service 204 attempts to perform proxy authentication by the invoker using the received general user ID and general user password. The access management service 204 checks the user table 700 and user role table 710, and verify whether the general user ID exists and the general user password is valid. If it is determined that the general user ID and general user password are valid, the proxy authentication is successful. In this case, the access management service 204 acquires the requested authorization token for the general user, the issuance date/time, and the expiration date from the token table 800, and returns them to the cooperation service 205 (step S1508). If the proxy authentication has failed, the access management service 204 returns information indicating it to the cooperation service 205.

The cooperation service 205 determines whether the information returned in step S1508 indicates an exception such as a general user proxy authentication error (step S1509). If a general user proxy authentication error is determined (YES in step S1509), the process advances to step S1510. If no error is determined (NO in step S1509), the process advances to a symbol B in FIG. 16. If a general user proxy authentication error is determined, the cooperation service 205 logs into the access management service 204 using the administrator user ID (step S1510). The processing in step S1510 is a subroutine shown in FIG. 17 like step S1504. After the user login processing, the cooperation service 205 transmits a user information acquisition request to the access management service 204 (step S1511). At this time, the authentication token of the tenant administrator and the general user ID are passed as arguments. The access management service 204 searches the user table 700 for the requested user ID, and returns user information to the cooperation service 205 (step S1512). At this time, the same user account (user ID) as the deleted user account is re-generated. If an exception happens, for example, a target user is absent, the access management service 204 returns information indicating it to the cooperation service 205.

The cooperation service 205 determines whether the information returned in step S1512 indicates an exception that a target user is absent (step S1513). If it is determined that a target user is absent (YES in step S1513), the process advances to step S1505 in which the cooperation service 205 re-generates a user account which previously existed but was automatically deleted; otherwise (NO is step S1513), it is determined in step S1513 that a target user is present but authentication of the user has failed in step S1509. In error processing, therefore, the cooperation service 205 returns "failure" as a response to the authorization token acquisition request to the printer management service 203 (step S1514).

Referring to FIG. 16, processing from the symbol B will be described. The cooperation service 205 determines whether the authorization token returned in step S1508 has been deleted from the token table 800 or has expired (step S1601). If the authorization token has not been deleted or has not expired, that is, it is determined that the authorization token is valid (NO in step S1601), the process advances to step S1604. If it is determined that the authorization token has been deleted or has expired (YES in step S1601), the process advances to step S1602.

If the process continues from the symbol A, the cooperation service 205 requests the access management service 204 to acquire an authorization token for the newly generated user account (step S1602). If the process advances from step S1601 to step S1602, the authorization token has been deleted or has expired, and thus the cooperation service 205 requests the access management service 204 to reissue an authorization token (step S1602). At this time, the invoker ID, the invoker password, the general user ID, the general user password, and the expiration date are passed as arguments.

The access management service 204 issues or reissues an authorization token to record it in the token table 800, and returns, as a response, the token ID 801, issuance date/time 803, and expiration date 802 to the cooperation service 205 (step S1603). Finally, the cooperation service 205 returns a response to the authorization token acquisition request to the printer management service 203 (step S1604). At this time, the issued or reissued authorization token of the general user is returned. The printer management service 203 stores the issued authorization token in the column of the authorization token 604 of the ID management table 600. After that, the printer management service 203 continues the subsequent processing shown in FIG. 11.

FIGS. 13 and 14 show the method of automatically deleting user accounts not in use and that of automatically deleting tokens, respectively. FIGS. 15 to 17 show the method of automatically re-generating a user account and automatically issuing an authorization token when an automatically deleted user account is requested. When a large number of free user accounts are registered in the above-described second use method, it is possible to suppress the total number of user accounts by combining the above methods, thereby reducing the management data size of the access management service 204.

Furthermore, it is possible to accommodate a large number of user accounts of an external service using the second use method in one tenant, and to reduce the data size, thereby decreasing the influence on a tenant using the first use method. This enables to solve the problems that, when registering a large number of user accounts in the second use method, the user account database of the access management service increases and the operation cost increases. Moreover, even after a user account is automatically deleted, the same user ID is re-generated. Therefore, the log of the log service 207 which is recorded using a user ID as a key is kept retroactively consistent.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-179912, filed Aug. 19, 2011, which is hereby incorporated by reference herein in its entirety.

What is claimed is:

1. An access management system including an access management server for managing user accounts and tokens corresponding to the managed user accounts, and a cooperation server for causing processes of a plurality of services to cooperate with each other, wherein said access management server comprises:

issuance unit configured to issue a token corresponding to a managed user account in response to a request of said cooperation servers;

account deletion unit configured to delete a user account, of the managed user accounts, which satisfies a predefined deletion conditions; and token deletion unit configured to delete an expired token of the tokens issued for the managed user accounts, and wherein said cooperation server comprises:

acquisition unit configured to acquire, when acquisition of a token corresponding to a user account managed by said access management server is requested by another server, if said account deletion unit has not deleted the user account, an issued token corresponding to the user account, and to cause, if said account deletion unit has already deleted the user account, said access management server to re-register the user account to acquire a token issued for the re-registered user account; and request unit configured to request, if the issued token acquired by said acquisition unit is expired, said issuance unit to reissue a token, wherein, if said token deletion unit has deleted the token corresponding to the user account re-registered by said acquisition unit, said request unit requests said issuance unit to reissue a token corresponding to the re-registered user account.

2. The system according to claim 1, wherein said access management server further:

manages information of a tenant to which each user account belongs in association with the user account to set, for each piece of tenant information, a condition under which said account deletion unit performs deletion, and manages tenant information different from tenant information for user accounts, which are not managed by the other server, of the user accounts managed by said access management server in association with user accounts managed by the other server to control not to delete the user accounts which are not managed by the other server.

3. The system according to claim 1, wherein the predefined deletion condition under which said account deletion unit performs deletion comprises one of:

deletion by said account deletion unit is not executed, a user account for which a predetermined period has elapsed after last login processing is deleted, and if a predefined number of accounts is exceeded, user accounts are deleted based on login dates/times in chronological order.

4. The system according to claim 1, wherein said acquisition unit re-registers the same user account as the user account which has been deleted by said account deletion unit, and holds a log of processing executed using the user account in association with the user account.

5. The system according to claim 1, wherein said account deletion unit performs deletion at a predetermined interval or in response to an instruction of an administrator.

6. The system according to claim 1, wherein said cooperation server uses a token issued by the other server to use a service provided by the other server.

7. An access management server in an access management system which includes the access management server for managing user accounts and tokens corresponding to the managed user accounts, and a cooperation server for causing processes of a plurality of services to cooperate with each other, comprising:

issuance unit configured to issue a token corresponding to a managed user account in response to a request of the cooperation server;

account deletion unit configured to delete a user account, of the managed user accounts, which satisfies a predefined deletion condition; and token deletion unit configured to delete an expired token of the tokens issued for the user accounts, wherein, said issuance unit reissues a token to said cooperation server based on a request for reissuance of the token if the token issued by the issuance unit has expired, and wherein, said access management server re-registers a user account that has already been deleted by said account deletion unit based on an acquisition request from the cooperation server to acquire a token for the user account, and reissues a token corresponding to the re-registered user account based on a request from the cooperation server.

8. A cooperation server in an access management system which includes an access management server for managing user accounts and tokens corresponding to the managed user accounts, and the cooperation server for causing processes of a plurality of services to cooperate with each other, comprising:

acquisition unit configured to acquire, when issuance of a token corresponding to a user account managed by the access management server is requested by another server, if the access management server has not deleted the user account, an issued token corresponding to the user account, and to cause, if the access management server has already deleted the user account, the access management server to re-register the user account to acquire a token issued for the re-registered user account; and request unit configured to request, if the issued token acquired by said acquisition unit is expired, the access management server to reissue a token, wherein, if the access management server has deleted the token corresponding to the user account re-registered by said acquisition unit, said request unit requests the access management server to reissue a token corresponding to the re-registered user account.

9. An access management method in an access management system which includes an access management server for managing user accounts and tokens corresponding to the managed user accounts, and a cooperation server for causing processes of a plurality of services to cooperate with each other, comprising in the access management server:
an issuance step of issuing a token corresponding to a managed user account in response to a request of the cooperation servers;
an account deletion step of deleting a user account, of the managed user accounts, which satisfies a predefined deletion condition; and
a token deletion step of deleting an expired token of the tokens issued for the user accounts, and in the cooperation server:
an acquisition step of acquiring, when acquisition of a token corresponding to the user account managed by the access management server is requested by another server, if the user account has not been deleted in the account deletion step, an issued token corresponding to the user account, and causing, if the user account has already been deleted in the account deletion step, the access management server to re-register the user account to acquire a token issued for the re-registered user account; and
a request step of requesting, if the issued token acquired in the acquisition step is expired, the access management server to reissue a token, and
wherein, if the token corresponding to the user account re-registered in the acquisition step has been deleted in the token deletion step, in the request step, the access management server is requested to reissue a token corresponding to the re-registered user account.

10. A non-transitory computer-readable medium storing a program for causing a computer to function as an access management server in an access management system which includes the access management server for managing user accounts and tokens corresponding to the managed user accounts, and a cooperation server for causing processes of a plurality of services to cooperate with each other, the program comprising:
an issuance step of issuing a token corresponding to a managed user account in response to a request of the cooperation server;
an account deletion step of deleting a user account, of the managed user accounts, which satisfies a predefined deletion condition;
a token deletion step of deleting an expired token of the tokens issued for the managed user accounts;
a receiving step of receiving a request from the cooperation server for reissuance of the token in a case where the token issued by the issuance step has expired, wherein, said issuance step reissues a token to said cooperation server based on the received request; and
a re-registering step of registering a user account that has already been deleted by said account deletion step in a case where an acquisition request is received from the cooperation server to acquire a token for the deleted user account,
wherein the issuance step reissues a token corresponding to the re-registered user account based on a request from the cooperation server for reissuance of the token.

11. A non-transitory computer-readable medium storing a program for causing a computer to function as a cooperation server in an access management system which includes an access management server for managing user accounts and tokens corresponding to the managed user accounts, and the cooperation server for causing processes of a plurality of services to cooperate with each other, the program comprising:
an acquisition step of acquiring, when issuance of a token corresponding to a user account managed by the access management server is requested by another server, if the access management server has not deleted the user account, an issued token corresponding to the user account, and causing, if the access management server has already deleted the user account, the access management server to re-register the user account to acquire a token issued for the re-registered user account; and
a request step of requesting, if the issued token acquired by said acquisition step is expired, said access management server to reissue a token,
wherein, if the access management server has deleted the token corresponding to the user account re-registered by said acquisition step, said request step requests the access management server to reissue a token corresponding to the re-registered user account.

12. A system including an access management server for managing user accounts and tokens corresponding to the managed user accounts, a cooperation server for causing processes of a plurality of services to cooperate with each other, and a printing apparatus, wherein,
said access management server comprises:
issuance unit configured to issue a token corresponding to a managed user account in response to a request of said cooperation server;
account deletion unit configured to delete a user account, of the managed user accounts, which satisfies a predefined deletion condition; and
token deletion unit configured to delete an expired token of the tokens issued for the managed user accounts, and
said cooperation server comprises:
acquisition unit configured to acquire, when acquisition of a token corresponding to the user account managed by said access management server is requested by another server, if said account deletion unit has not deleted the user account, an issued token corresponding to the user account, and to cause, if said account deletion unit has already deleted the user account, said access management server to re-register the user account to acquire a token issued for the re-registered user account; and
request unit configured to request, if the issued token acquired by said acquisition unit is expired, said issuance unit to reissue a token, and
wherein, if said token deletion unit has deleted the token corresponding to the user account re-registered by said acquisition unit, said request unit requests said issuance unit to reissue a token corresponding to the re-registered user account.

* * * * *